United States Patent
Kohler et al.

(10) Patent No.: US 6,373,602 B1
(45) Date of Patent: Apr. 16, 2002

(54) FACSIMILE TRANSMISSION OF HIGHLIGHT INFORMATION

(75) Inventors: Timothy L. Kohler, San Jose; Eli Schetrit, Los Altos, both of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/249,437

(22) Filed: Feb. 12, 1999

(51) Int. Cl.$^7$ .................................................. H04N 1/46
(52) U.S. Cl. ........................ 358/538; 358/539; 382/164
(58) Field of Search ................................ 358/537, 538, 358/539, 500, 448, 452, 453, 455, 456, 458; 399/184; 382/164

(56) References Cited

U.S. PATENT DOCUMENTS

| | | | |
|---|---|---|---|
| 3,914,043 A | 10/1975 | McVeigh | 399/184 |
| 4,777,510 A | 10/1988 | Russel | 399/184 |
| 4,857,955 A | 8/1989 | Crandall | 399/184 |
| 5,048,109 A | 9/1991 | Bloomberg et la. | 382/164 |
| 5,098,817 A * | 3/1992 | Voorhees | 430/396 |
| 5,138,465 A | 8/1992 | Ng et al. | 358/453 |
| 5,272,764 A | 12/1993 | Bloomberg et al. | 358/453 |
| 5,359,931 A | 11/1994 | Voorhees | 101/375 |
| 5,579,407 A | 11/1996 | Murez | 358/453 |
| 5,619,592 A | 4/1997 | Bloomberg et al. | 382/175 |

* cited by examiner

Primary Examiner—Kimberly A. Williams
(74) Attorney, Agent, or Firm—Fitzpatrick, Cella, Harper & Scinto (57) ABSTRACT

A system to transmit and receive image data of a document having a colored region including input of document image data to a transmitting device, detection of the colored region, calculation of a vectorized representation of the colored region, querying of a receiving device to determine whether or not the receiving device supports vectorized colored regions, reception of a query to determine whether vectorized colored regions are supported by the receiving device, an indication that vectorized colored regions are supported by the receiving device, transmission of the document image data and the vectorized representation from the transmitting device to the receiving device, reception of the vectorized representation of the colored region at the receiving device, reception of document image data corresponding to the document image at the receiving device, and alteration of the received document image data based on the received vectorized data.

33 Claims, 7 Drawing Sheets

Canon

Canon Information Systems, Inc.
Technical Information Center Newsletter
Published by Joyce Peluso
April 27, 1992, Volume 2, No. 4-4

Canon Wants Mutually Rewarding Coexistence

Source: Fortune, 7/29/91

Ryuzaburo Kaku, Chairman of the Board of Canon, Inc. in his recent interview had the following to say about the corporate world. The world is divided into four types of companies:
  (1) Purely capitalistic enterprises that exploit their workers for profit.
  (2) Those where management and labor work closely together to maximize profits, but don't pay enough attention to the community
  (3) A company that both tries to make money but also seeks to fulfill its corporate responsibilities to society, but in a small scale way to a particular country or region.
  (4) A highly evolved type of company that contributes positively to world prosperity.

Canon is aspiring to be the fourth type of company. This is a company that is socially responsible and practices good corporate citizenship at home and overseas and that can be referred to as a true global corporation. We have a basic philosophy to achieve a mutually rewarding coexistence among employees, shareholders, customers and the communities in which we do business.

Canon Develops World's First Ferroelectric Liquid Crystal Display

Source: Wall Street Journal, 10/2/91,
Canon Press Release, 10/1/91

In a news conference yesterday, Hiroshi Tanaka, a Canon senior managing director said that the company has succeeded in developing the world's first ferroelectric liquid crystal (FLC) display screen. The screen will be test marketed next spring in Canon's EZPS Japanese language DTP system.

Canon's Corporate Culture to Blend Best of U.S. & Japan

Source: Fortune, 8/26/91

Mr. Hideharu Takemoto, President of Canon U.S.A. was recently interviewed by Fortune Magazine and had the following to say about Canon in North America.
  Mr. Takemoto wants to create a new Canon corporate culture, "The best of American and Japanese cultures must be blended to produce a richer corporate alchemy—a new ideal."
  Canon wants to create more jobs for Americans in the 1990s and to make them an integral part of the Canon family. Mr. Takemoto is further committed to cultivating local talent and moving local executives up through the ranks of Canon's highest corporate echelons.

Ink-Jet Printer Market Share
Source: Computer Reseller News/Info Corp

| Selected Ink-Jet printers | March | April | May | June |
|---|---|---|---|---|
| Apple Stylewriter | 17.5% | 26.7% | 41.5% | 31.5% |
| H-P | | | | |
| PaintJet | <1% | 2% | <1% | <1% |
| DeskJet 500 | 49% | 39% | 31.6% | 24.6% |
| DeskWriter | 31% | 27.3% | 20.4% | 14.9% |
| Canon | | | | |
| BJ10E | <1% | 3.4% | 4.3% | 7.9% |
| BJ300/330 | <1% | <1% | <1% | <1% |

Canon Information Systems, Inc.

Page 1

> Mr. Takemoto wants to create a new Canon corporate culture, "The best of American and Japanese cultures must be blended to produce a richer corporate alchemy--a new ideal."

*FIG. 6A*

> Mr. Takemoto wants to create a new Canon corporate culture, "The best of American and Japanese cultures must be blended to produce a richer corporate alchemy--a new ideal."

*FIG. 6B*

> Mr. Takemoto wants to create a new Canon corporate culture, "The best of American and Japanese cultures must be blended to produce a richer corporate alchemy--a new ideal."

*FIG. 6C*

> Mr. Takemoto wants to create a new Canon corporate culture, "The best of American and Japanese cultures must be blended to produce a richer corporate alchemy--a new ideal."

*FIG. 6D*

| FIG. 6A | FIG. 6B |
|---------|---------|
| FIG. 6C | FIG. 6D |

FACSIMILE TRANSMISSION OF HIGHLIGHT INFORMATION

BACKGROUND OF THE INVENTION

1. Field of the Invention

The present invention relates to systems for encoding and decoding facsimile transmissions. More particularly, the present invention concerns a system to enable transmission of color, or highlight, information between facsimile devices.

2. Description of the Related Art

Conventional facsimile devices are used to transmit an image of a document between remote locations. In operation, these facsimile devices scan a document, produce a 100 dpi binary bitmap of the document, encode the bitmap according to a facsimile transmission protocol, establish a connection with a remote facsimile device, and transmit the encoded data to the remote device. At the remote device, the data is decoded and a hardcopy of the bitmap is output. Alternatively, the decoded bitmap is stored on a computer-readable medium for later display or hardcopy output.

Fluorescent highlighter pens are commonly used to visibly change a background color of a document from white to another color in order to highlight particular regions of the document. However, conventional black and white facsimile devices detect and transmit such highlighted regions as solid black regions or, alternatively, detect the highlighted regions as white regions. In the latter case, the transmitted data is unchanged by the highlighting. Accordingly, a sender of a black and white facsimile transmission is unable to use highlighting as described above to bring a particular region of document to the attention of a receiver.

Color facsimile devices have recently become available. Such devices are capable of transmitting and receiving color image data using a color facsimile transmission protocol, such as ITU-T Rec. T.42 "Continuous-tone Color Representation Method For Facsimile", 1994. Accordingly, these devices are capable of transmitting and receiving color image data indicating a highlighted region of a document. However, assuming that 8-bit RGB values are used to represent the color image data, one page of such color image data is represented by a file twenty-four times larger than a file representing one page of binary data of equal resolution. Such an increase in file size is undesirable for several reasons.

First, in a case that a facsimile device is out of paper, the device stores any received data in a computer-readable memory. Accordingly, a number of pages storable in the memory is inversely proportional to the file size of data representing a page. In addition, more time is required to transmit larger files than smaller files. As a result of this additional time, telephone charges incurred when transmitting larger files are greater than those for smaller files. Therefore, although color facsimile devices are capable of transmitting highlight information, the size of one page of color image data and the time required to transmit a page limit the appeal of such devices.

In view of the foregoing, what is needed is a system for transmitting highlight information between facsimile devices in which the file size and transmission time of one page of data containing highlight information is not significantly greater than that of one page of conventional binary facsimile data.

SUMMARY OF THE INVENTION

The present invention addresses the foregoing by representing a highlight region of an original document using vectorized data and by transmitting the vectorized data and image data corresponding to the original document using a facsimile transmission protocol. Advantageously, the vectorized data does not add significantly to the amount of transmitted data. As a result, a number of pages of image data storable in a memory and a transmission time thereof are comparable to that offered by conventional binary facsimile data.

Therefore, in one aspect, the present invention concerns a system for facsimile transmission of an original document having a colored region which includes transmission of image data corresponding to the original document using a facsimile transmission protocol and transmission of vectorized data using the facsimile transmission protocol. Advantageously, the vectorized data describes an outline of the colored region.

By transmitting both the image data and the vectorized data, a location and shape of the colored region within the document can be specified. Such information can be used to change a background color of the transmitted image data at the location, to create a border around the location, or to otherwise alter the transmitted image data. Furthermore, the vectorized data contributes only a small portion to the size of the transmitted data, and therefore does not slow data transmission significantly.

In another aspect, the present invention relates to a system for use in a device for receiving document image data which includes reception of a query from a transmitting device to determine whether vectorized colored regions are supported by the device, indication to the transmitting device that vectorized colored regions are supported by the device, reception of vectorized data using a facsimile transmission protocol, the vectorized data corresponding to a colored region in a document image, reception of document image data using a facsimile transmission protocol, the image data corresponding to the document image, and alteration of the received document image data based on the received vectorized data.

By virtue of the foregoing, both a location and shape of a colored region within a document can be determined. This information can be used to change the background color of the received image data at the location, to create a border around the location, or to otherwise alter the received image data. Additionally, the vectorized data is a relatively small portion of the received data, and therefore does not add significantly to the size of the received data.

In an additional aspect, the present invention relates to a system for transmitting an image of a document containing a colored region including input of document image data, detection of the colored region, calculation of a vectorized representation of the colored region, query of a receiving device to determine whether or not the receiving device supports vectorized colored regions, and, in a case that it is determined that the receiving device supports vectorized colored regions, transmission of the document image data and the vectorized representation to the receiving device using a facsimile transmission protocol.

According to the foregoing aspect, a vectorized representation of a colored region within a document can be selectively transmitted to a receiving device in a case that it is determined that the receiving device supports such functionality. Moreover, the vectorized representation can be used to change a background color of the image data at a location specified by the representation, to create a border around the location, or to otherwise alter the image data. Advantageously, transmission of the vectorized representation does not increase transmission time significantly. The vectorized representation also does not contribute significantly to the size of the received data.

In a further aspect, the invention is a system to transmit and to receive image data of a document having a colored region. The system includes input of document image data to a transmitting device, detection of the colored region, calculation of a vectorized representation of the colored region, query of a receiving device to determine whether or not the receiving device supports vectorized colored regions, reception of the query to determine whether vectorized colored regions are supported by the receiving device, indication to the transmitting device that vectorized colored regions are supported by the receiving device, transmission of the document image data and the vectorized representation from the transmitting device to the receiving device using a facsimile transmission protocol, reception of the vectorized representation of the colored region at the receiving device using the facsimile transmission protocol, reception of document image data corresponding to the document image at the receiving device using the facsimile transmission protocol, and alteration of the received document image data based on the received vectorized data.

By virtue of this aspect, transmission of the vectorized representation does not increase transmission time significantly, and the vectorized representation not contribute significantly to the size of the received data.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 6, comprising

DETAILED DESCRIPTION OF THE PREFERRED EMBODIMENTS

Figure 1:
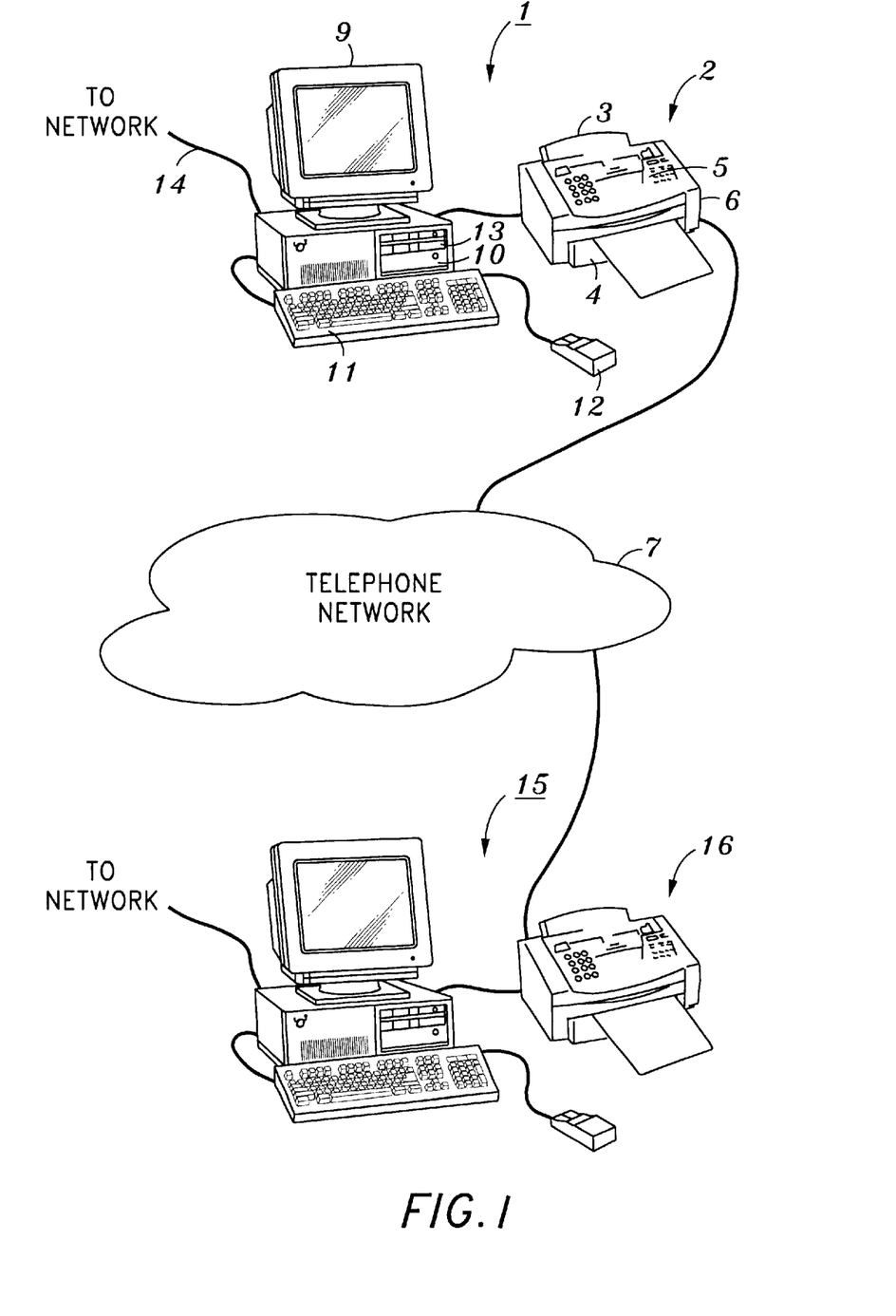
FIG. 1 is an external view of a representative system embodying the present invention.

FIG. 1 is an external view of representative computing equipment embodying a system to transmit highlight information according to the present invention.

Shown in FIG. 1 is computing equipment 1, which is an Intel Pentium®-based computer having a windowing environment such as the Microsoft Windows98® operating system. Connected to computing equipment 1 is multi-function device 2, which provides copying, scanning, printing and facsimile transmission/reception functionality to computing equipment 1. Multi-function device 2 is preferably a Canon Multipass® C5500, which utilizes inkjet technology and is capable of performing the above functions in full color.

Multi-function device 2 includes input tray 3, from which recording media are drawn into device 2 to have ink deposited thereon. The media are then output through output area 4. Such a procedure may be in response to a print command from computing equipment 1, reception of facsimile data, or a copy command received either from computing equipment 1 or a user through user interface panel 5.

A document fed into input slot 6 is scanned to produce image data representative of the document. Based on an instruction received from equipment 1 or user interface panel 5, the multi-function device may be operated to copy the fed document, to transmit the document over worldwide telephone network 7 via telephone line 8 using a facsimile transmission protocol, or to merely store the produced data. Depending upon the specified scanning operation, the data produced by the scanning may be 100 dpi binary data in a facsimile-transmission format, 100 dpi 24-bit RGB data in a facsimile-transmission format, 600 dpi 24-bit RGB data, 600 dpi binary data, or any other type of data format supported by device 2.

Computing equipment 1 is also provided with color display monitor 9, using which computing equipment 1 displays images to a user. Fixed disk drive 10 is used for storing data files, application program files, and device drivers, keyboard 11 is used for inputting text data and for manipulating objects displayed on display monitor 9, and pointing device 12, such as a mouse, is provided for pointing to and for manipulating objects displayed on display monitor 9. Specifically, keyboard 11 and mouse 12 may be used to enter data and commands into dialog boxes and property sheets for controlling device 2, which are produced and displayed on monitor 9 by device drivers stored on disk 10.

Computing equipment 1 also includes floppy disk drive 13 for reading from and writing to a floppy diskette. In this regard, document image files, as well as computer-executable process steps embodying the present invention, may be stored either on fixed disk 10 or on a floppy disk inserted in floppy disk drive 13. Alternatively, document image files and/or computer-executable process steps may be stored on a CD-ROM and accessed via a CD-ROM drive (neither shown).

Document image data files and computer-executable process steps embodying the present invention may also be accessed over a local area network via network connection 12, or, from another source such as the World Wide Web via a modem (not shown) connected to standard telephone line 13.

Typically, applications stored on fixed disk 8 are downloaded from a computer-readable medium, such as a floppy disk, a CD-ROM, a network drive, or the World Wide Web and thereafter stored on disk 8. Document images may also be obtained from any of these sources, or from device 2, which, as described above, is capable of scanning a document to produce image data representing the document to computing equipment 1.

In operation, and under control of the windowing operating system, stored application programs are selectively activated to process and to manipulate stored data. In accordance with operator instructions, and based on the stored application programs, commands are issued, for example, to input a document image via device 2, to display the document image on monitor 9, to manipulate the displayed image using keyboard 11 and mouse 12, and to transmit the image over line 8 and network 7 to a remote facsimile device.

In this regard, telephone line 8 is connected to telephone network 7 in order to provide access to any other device connected to telephone network 7. Accordingly, computing equipment 1 can not only communicate with servers located on the World Wide Web through line 8, but can also transmit and receive facsimile transmissions to and from other facsimile-enabled equipment also connected to network 7.

For example, computing equipment 15 is connected to telephone network 7 and can therefore transmit and receive facsimile transmissions to and from computing equipment 1. The various components provided with and connected to computing equipment 1 are substantially identical to those described above with respect to computing equipment 1, and detailed descriptions thereof are omitted for the sake of brevity. One such component is multi-function device 16, which is substantially identical to device 2.

Figure 2:
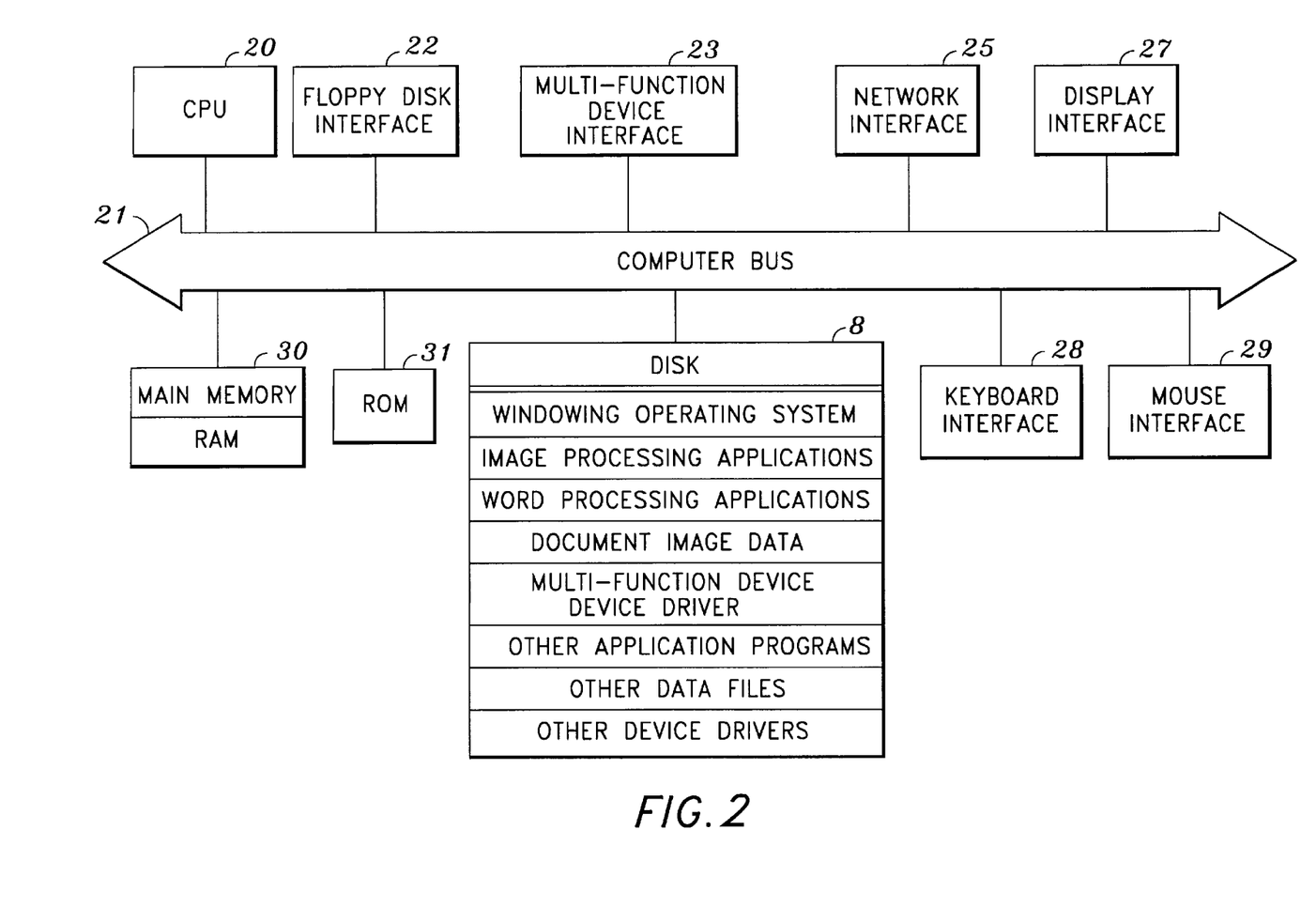
FIG. 2 is a block representation of the internal architecture of representative computing equipment.

FIG. 2 is a detailed block diagram showing the internal architecture of computing equipment 1. It should be noted that computing equipment 15 follows substantially the same architecture as that shown in FIG. 2. As shown, computing equipment 1 includes a central processing unit (CPU) 20, such as the Intel Pentium® microprocessor, interfaced to computer bus 21. Also interfaced to computer bus 21 are floppy disk drive interface 22, multi-function device interface 23, which is preferably a bi-directional parallel interface, network interface 25 for interfacing to network connection 14, display monitor interface 27, keyboard interface 28 and mouse interface 29.

Disk 10 stores, among other files necessary for operation of computing equipment 1, files comprising a windowing operating system, computer-executable process steps embodying image processing applications and word processing applications, document image data, a device driver for a multi-function device embodying the present invention, other application programs, other data files, and other device drivers.

Main memory 30, such as a random access memory (RAM), interfaces to computer bus 21 so as to provide CPU 20 with access to memory storage. In particular, when executing computer-executable process steps such as those stored on disk 10, CPU 20 loads those steps from disk 10 or another storage media into main memory 30 and executes those process steps out of main memory 30. Main memory 30 also provides buffer storage for storing data used during execution of process steps according to the present invention.

Read-only memory (ROM) 31 is used for storing computer-executable process steps, such as those used during boot-up, or basic input/output operating system (BIOS) sequences for operation of, for example, keyboard 11.

Figure 3:
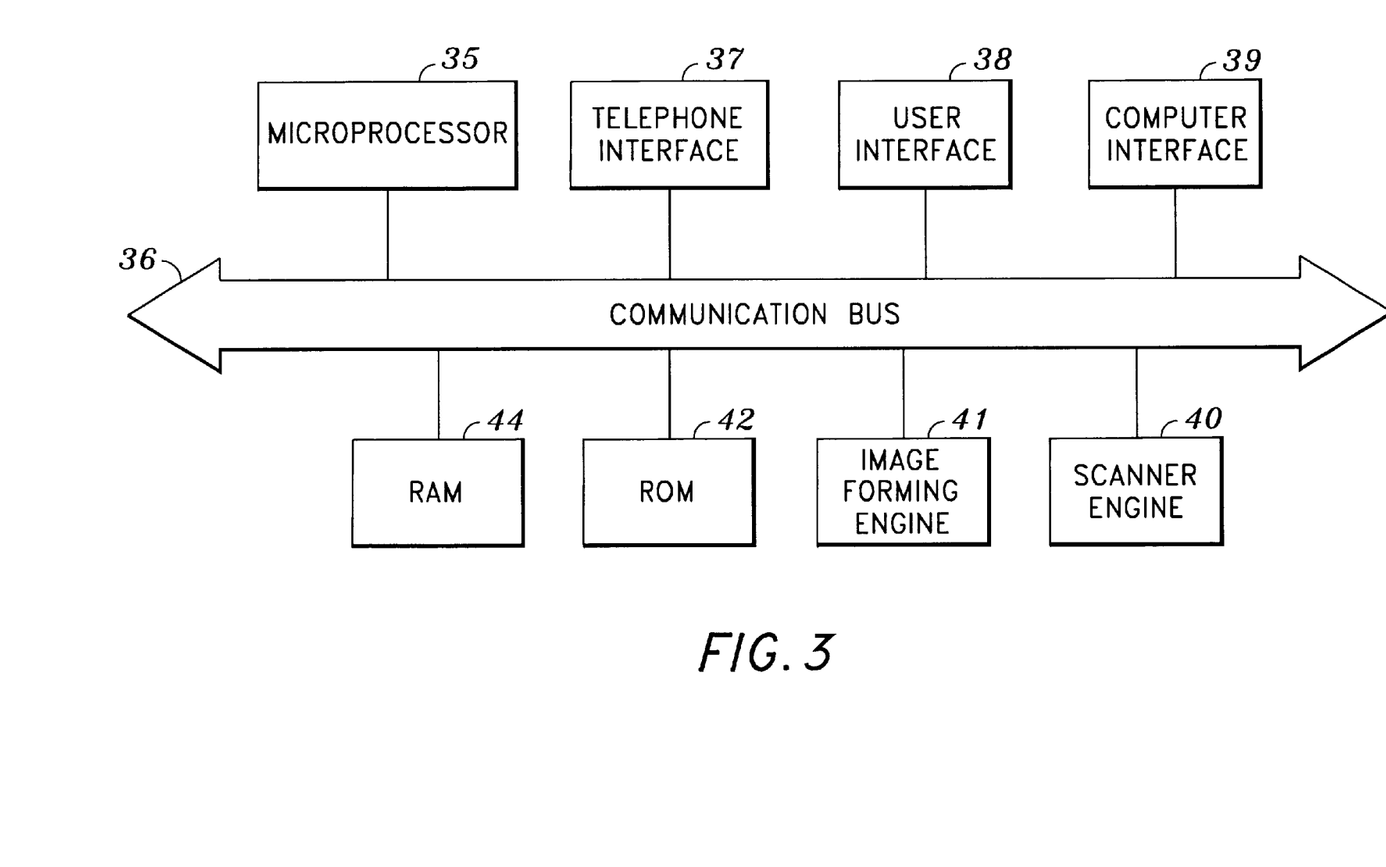
FIG. 3 is a block representation of the internal architecture of a scanning/copying/printing/faxing multi-function device.

FIG. 3 is a block diagram of the internal architecture of multi-function device 2. As stated above, device 16 shares a similar architecture as that shown in FIG. 3. Specifically, the architecture includes microprocessor 35, which interfaces to communication bus 36. Also interfaced to communication bus 36 are telephone interface 37 and user interface 38. Multi-function device 2 communicates over telephone network 7 through telephone interface 37. In addition, user interface 38 connects to user interface panel 5 to receive instructions from and to present information to a user. Many of the functions provided by device 2 can be controlled either through computing equipment 1 or panel 5 when configured as shown in FIG. 1. Panel 5 also provides control when operating device is detached from computing equipment 1, in a stand-alone mode.

Computer interface 39 is used to receive data and commands from computing equipment 1. As described above, computer interface 39 is preferably a bi-directional parallel interface over which stored image data, device commands, or computer-executable process steps are transmitted.

Communication bus 36 also interfaces to scanner engine 40 to allow microprocessor 35 to control scanner engine 40. Scanner engine 40 includes mechanisms to take in a document, to produce an electronic color representation of the document, and to eject the document. The electronic representation may be processed and/or sent to image forming engine 41 over bus 36. Image forming engine 41 is capable of subsequently producing a hardcopy of the electronic representation, thereby completing a copying function.

Image forming engine 41 is also used to execute a printing function to print data received from computing equipment 1, and a facsimile function to produce a hardcopy of facsimile transmissions received over telephone interface 37. As described above, image forming engine 41 is preferably a full-color inkjet engine. However, other types of engines, including laser beam or black/white, can be used in conjunction with the present invention.

ROM 42 is used for storing processor-executable process steps needed for operation of device 2, such as those used to control panel 5 and those used during boot-up, diagnostic testing, scanning, printing, copying, faxing, etc. In particular, processor 35 retrieves these steps from ROM 42 over bus 36 and executes the steps to control device operation.

RAM 44 also stores processor-executable process steps to control device 2. Such steps may be stored in RAM 44 during manufacture of device 2, or may be downloaded from computing equipment 1 to provide updated functionality. RAM 44 also provides buffer storage for storing data used during device operation.

Figure 4:
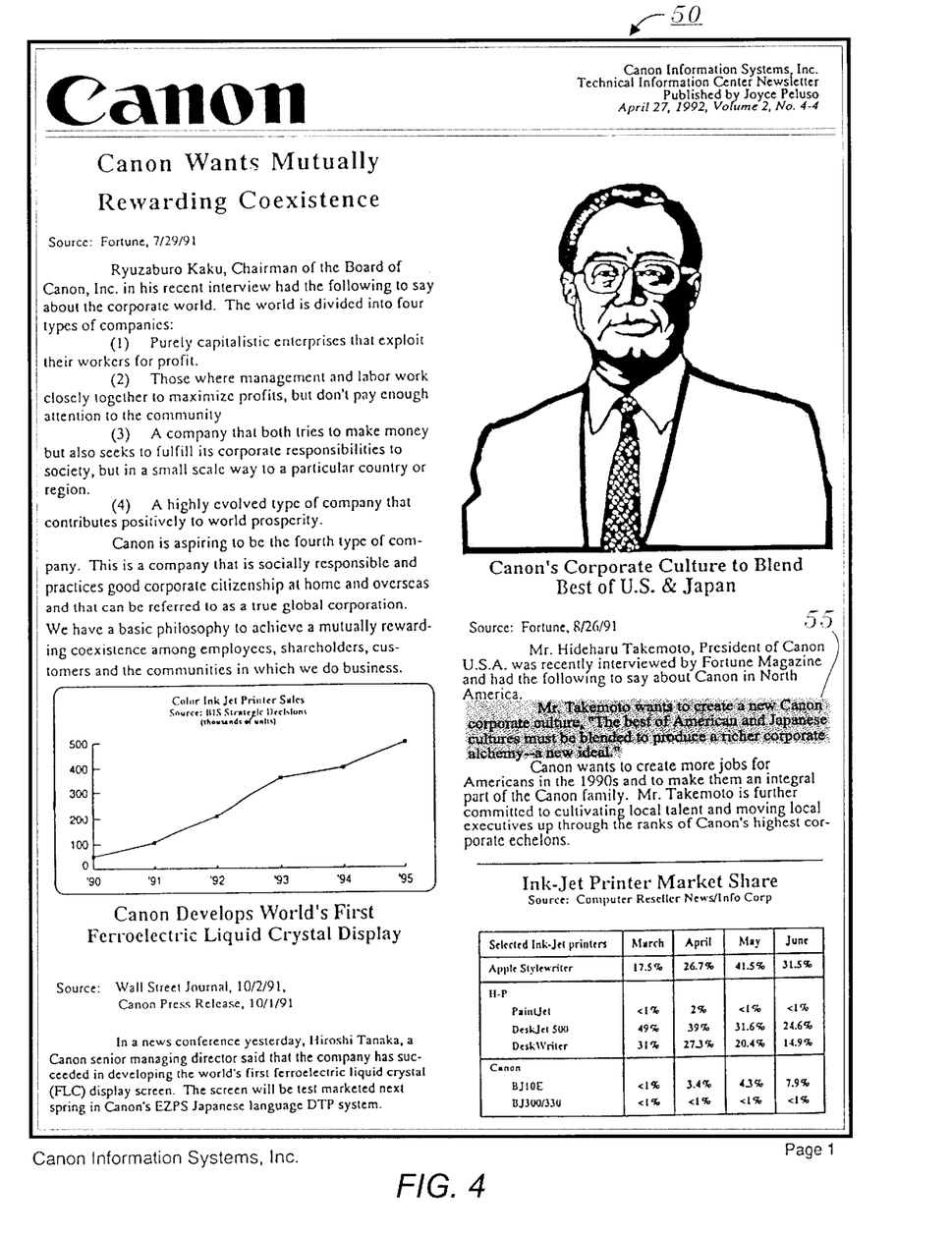
FIG. 4 is a view of a document having a highlighted region.

FIG. 4 shows document 50 including highlighted region 55. It should be noted that the shaded area of region 55 is intended to represent a highlighter color, such as yellow, green, or the like. Other colors may be used to highlight a region according to the present invention, but a user preferably uses a color which does not obscure the black text of the highlighted region.

Figure 5:
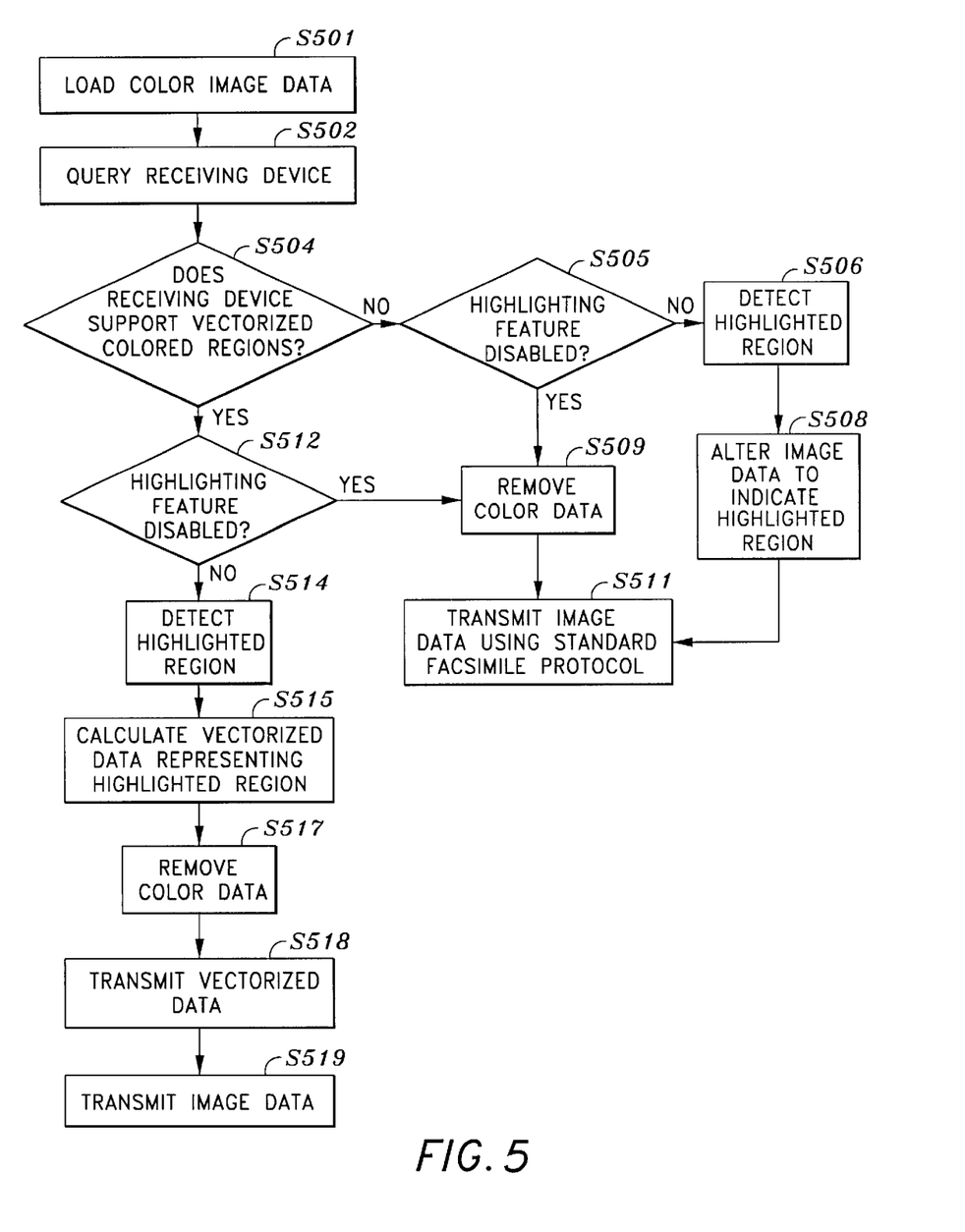
FIG. 5 is a flow diagram of computer-executable process steps to transmit data using a facsimile protocol according to the present invention.

FIG. 5 is a flow diagram of process steps to transmit a document such as document 50 according to the present invention. Preferably, the FIG. 5 process steps are stored in ROM 42 of multi-function device 2 and are executed by processor 35. The FIG. 5 process steps may also be embodied in a device driver stored on disk 10 and executed so as to control device 2. Briefly, the FIG. 5 process steps include steps to input document image data, detect a colored region of the document image data, calculate a vectorized representation of the colored region, query a receiving device to determine whether or not the receiving device supports vectorized colored regions, and transmit the document image data and the vectorized representation to the receiving device using a facsimile transmission protocol in a case that it is detected that the receiving device supports vectorized colored regions.

More specifically, flow begins at step S501, wherein color image data is loaded into RAM 44. As an example of step S501, scanner engine 40 reads color image data of document 50 once document 50 is fed into slot 6 and the read data is passed over communication bus 36 to RAM 44. Of course, image data can be loaded in step S501 from many other sources, including, but not limited to, disk 10, network connection 14, the World Wide Web, or a facsimile transmission over telephone connection 8.

Next, in step S502, a receiving device, such as device 16, is queried using a facsimile protocol to determine whether the receiving device supports vectorized colored regions according to the present invention. This query preferably occurs during handshaking procedures required to establish a connection between the receiving device and the querying device. In the preferred embodiment, the querying device transmits a Non-standard Facilities (NSF) frame which identifies the vectorized colored region protocol. If the receiving device supports the protocol, the receiving device responds by transmitting a Non-standard Facilities set-up (NSS) frame, also identifying the protocol.

If it is determined in step S504, based on the step S502 query, that the receiving device does not support vectorized colored regions, flow proceeds to step S505. In step S505, it is determined whether the highlighting feature is currently disabled in the transmitting device. This feature may be disabled either through user interface panel 5 or through property pages displayed by a device driver on display 9. If the feature is not disabled, flow continues to step S506.

A highlighted region of the loaded color image data is detected in step S506. Many different techniques may be used to detect the highlighted region, however, according to a preferred technique, a histogram of the image data is examined to detect large, highly chromatic areas. A highlighted region is then identified at those areas which contain pixels having similar RGB values and in which the similar RGB values are different from RGB values of surrounding areas. Area 55 of FIG. 4 is an example of a highlighted region according to the invention.

It should be noted that the highlighting discussed with respect to step S506 may be applied to a hardcopy using a highlighter pen prior to scanning in the hardcopy, or may be applied to image data of a document using an image processing or painting application program. In addition, highlighting can be added to a document using existing word processing programs, such as Microsoft Word®. Upon printing or faxing a document containing highlight information from one of these programs, the highlight information is used to include a highlighted region in the output document.

Figure 6:
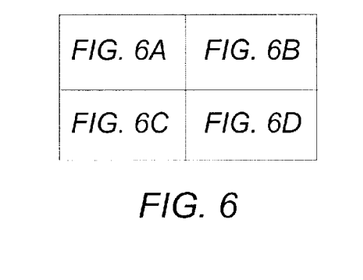

Flow proceeds from step S506 to step S508, in which the image data is altered to indicate the highlighted region. This alteration consists first of binarizing the loaded image data, while ensuring that pixels of the highlighted region having a value of the highlight color are binarized to a zero value (white). Second, data corresponding to the highlighted region is altered so that the highlighted region will be emphasized to a user viewing the output from the transmitting device. FIG. 6 shows several types of alterations which may be used to emphasize area 55 of document 50.

Figure 6A:
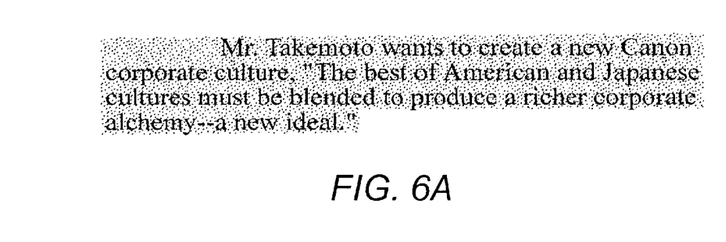
FIGS. 6A to 6D, shows document data altered in accordance with the present invention.
Figure 6B:
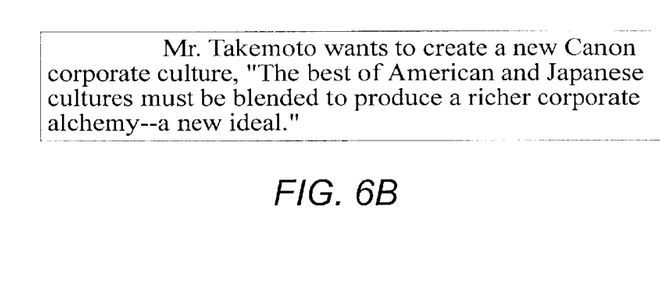
Figure 6C:
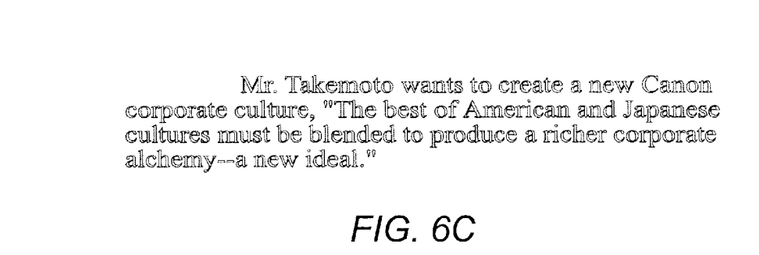
Figure 6D:
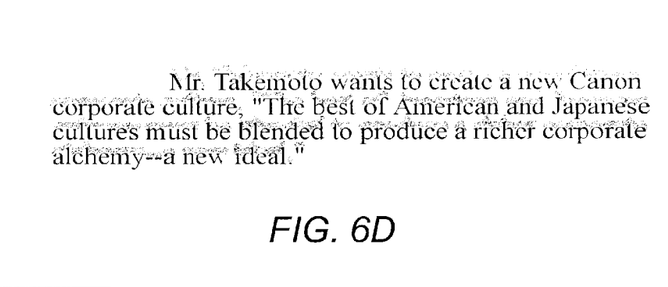

FIG. 6A, for example, shows region 55 emphasized using a gray background simulated using a pattern of black and white pixels. FIG. 6B, on the other hand, shows region 55 outlined by a thin black border. FIG. 6C shows region 55 in an outline text mode. Finally, FIG. 6D shows a drop shadow effect applied to the text of region 55. Preferably, the type of alteration applied in step S508 is determined according to settings entered through panel 5 or through the above-mentioned property pages.

Lastly, in step S511, the altered binary image data is transmitted to the receiving device using a standard facsimile protocol.

If, in step S505, it is determined that the highlighting feature is disabled, flow proceeds to step S509, in which the received image data is binarized as described with respect to step S508, in that it is ensured that pixels in the highlighted region of the highlight color are binarized to a zero value. Flow then continues to step S511.

On the other hand, if, in step S504, it is determined that the receiving device supports vectorized colored regions, flow proceeds to step S512. In step S512, it is determined whether or not the highlighting feature is disabled in either the transmitting device or the receiving device. If so, flow continues to step S509 and proceeds thereafter as described above.

If not, flow continues to step S514, in which the highlighted region is detected as described with respect to step S506. Flow then proceeds from step S514 to step S515, in which vectorized data representing an identified highlighted region is calculated. In order to calculate the vectorized data, a bitmap of the highlighted region is first created. A polygon is then fit to surround the region, using any one of well-known polygon-fitting algorithms. The vectorized data calculated in step S515 preferably consists of a series of coordinates of each vertex of the polygon, beginning at an upper left-most corner. In a case that the upper left-most region is concave, the series begins at the upper-most vertex. The remaining coordinates in the series are designated relative to the beginning point, and the last point must be identical to the beginning point. Since this last point is designated relative to the beginning point, the coordinates of the last point are necessarily (0,0).

The image data is then binarized in step S517 as described with respect to step S509. Next, in step S518, the vectorized data is transmitted, using a facsimile transmission protocol, to the receiving device as a block of binary data. In a preferred embodiment, the block of vectorized data includes color information indicating the highlight color. After step S518, the binarized image data is also transmitted using the facsimile transmission protocol.

By virtue of the foregoing process steps, highlight information can be transmitted in small files quickly and using existing facsimile hardware. In this regard, it should be noted that the foregoing process steps can be embodied in a system having stand-alone facsimile devices. Of course, the present invention can also be embodied in a system including stand-alone multi-function devices.

Figure 7:
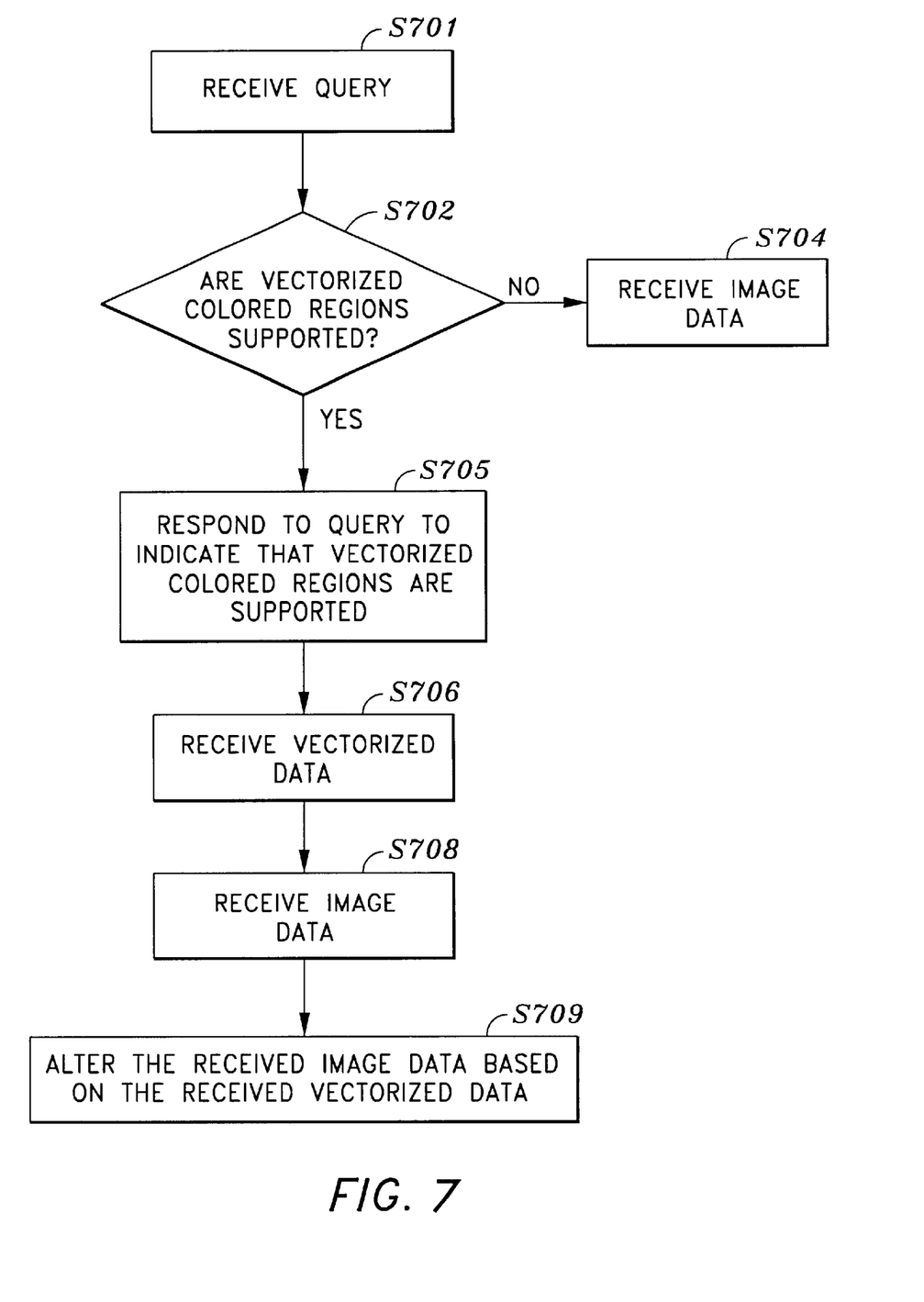
FIG. 7 is a flow diagram of computer-executable process steps to receive data using a facsimile protocol according to the present invention.

FIG. 7 is a flow diagram of process steps to receive a document such as document 50 according to the present invention. Preferably, the FIG. 7 process steps are stored in a ROM of multi-function device 16 and are executed by a processor of device 16. The FIG. 7 process steps may also be embodied in a device driver stored in and executed in computing equipment 15 to control device 16.

Briefly, the FIG. 7 process steps include steps to receive a query from a transmitting device to determine whether vectorized colored regions are supported by the device, indicate to the transmitting device that vectorized colored regions are supported by the device, receive vectorized data using a facsimile transmission protocol, the vectorized data corresponding to a colored region in a document image, receive document image data using the facsimile transmission protocol, the image data corresponding to the document image, and alter the received document image data based on the received vectorized data.

Particularly, flow begins at step S701, in which a query is received from a transmitting device as to whether or not the receiving device supports vectorized colored regions according to the present invention. This query preferably occurs during handshaking procedures required to establish a connection between the receiving device and the querying device. As described above, the query may be a Non-standard Facilities (NSF) frame which identifies the vectorized colored region protocol.

If the receiving device does not support the protocol, no NSS frame is transmitted and flow proceeds to step S704, at which point image data is received using a standard facsimile protocol. In the present example, the received data can then be printed by receiving device 16, displayed by computing equipment 15, or stored in receiving device 16 or computing equipment 15 for later use.

If it is determined in step S702 that the receiving device supports the protocol, the receiving device responds in step S705 by transmitting a Non-standard Facilities set-up (NSS) frame, also identifying the protocol. After completion of step S705, the receiving device receives vectorized data indicative of a highlighted region of a document. In a preferred embodiment, information indicating a color of the highlighted region is also received in step S706. Next, binary image data of the document is received in step S708. In step S709, the received image data is altered based on the received vectorized data.

Preferably, in step S709, a highlight color is substituted for all white areas within a region of the image data indicated by the vectorized data. Accordingly, the resulting altered image data would reflect a black and white document having a highlighted region. The highlight color may be selected by a user, or, in order to accurately reflect the original document, the region can be colored with color information received in step S706.

In a case that the foregoing alteration is performed in step S709, text within the highlighted region may become obscured, especially when using a highlight color other than yellow. This phenomenon may be alleviated by, after replacing the white regions with colored pixels, moving each black pixel in the highlighted region up one pixel location and to the left one pixel location. In addition, pixels at the original pixel locations from which the black pixels were moved are colored white. This procedure produces a "reverse drop shadow" effect, thereby providing improved readability.

Of course, any other alterations of the received image data based on the received vectorized data, including those shown in FIG. 6, may be performed in step S709 in keeping with the present invention.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method for facsimile transmission of an original document having a colored region comprising:

transmitting image data corresponding to the original document using a facsimile transmission protocol; and transmitting vectorized data using the facsimile transmission protocol, the vectorized data describing an outline of the colored region.

2. A method according to claim 1, further comprising:

receiving the image data corresponding to the original document;

receiving the vectorized data; and altering the received image data based on the received vectorized data.

3. A method according to claim 1, further comprising:

detecting the colored region of the original document; and analyzing the colored region to produce vectorized data corresponding to a location of the colored region within the original document.

4. A method according to claim 1, further comprising:

transmitting color data using the facsimile transmission protocol, the color data describing a color of the colored region.

5. A method for transmitting an image of a document containing a colored region, comprising:

inputting document image data;

detecting the colored region;

calculating a vectorized representation of the colored region;

querying a receiving device to determine whether or not the receiving device supports vectorized colored regions; and transmitting the document image data and the vectorized representation to the receiving device using a facsimile transmission protocol in a case that it is determined that the receiving device supports vectorized colored regions.

6. A method according to claim 5, further comprising altering the document image data based on the vectorized representation in a case that the receiving device does not support vectorized colored regions.

7. A method according to claim 5, further comprising:

transmitting color data using the facsimile transmission protocol, the color data describing a color of the colored region.

8. A method for use in a device for receiving document image data comprising:

receiving a query from a transmitting device to determine whether vectorized colored regions are supported by the device;

indicating to the transmitting device that vectorized colored regions are supported by the device;

receiving vectorized data using a facsimile transmission protocol, the vectorized data corresponding to a colored region in a document image;

receiving document image data using the facsimile transmission protocol, the image data corresponding to the document image; and altering the received document image data based on the received vectorized data.

9. A method according to claim 8, further comprising:

receiving color data using the facsimile transmission protocol, the color data describing a color of the colored region.

10. A method for transmitting and receiving image data of a document having a colored region, comprising:

inputting document image data to a transmitting device;

detecting the colored region;

calculating a vectorized representation of the colored region;

transmitting a query to a receiving device to determine whether or not the receiving device supports vectorized colored regions;

receiving the query to determine whether vectorized colored regions are supported by the receiving device;

indicating to the transmitting device that vectorized colored regions are supported by the receiving device;

transmitting the document image data and the vectorized representation from the transmitting device to the receiving device using a facsimile transmission protocol;

receiving the vectorized representation of the colored region at the receiving device using the facsimile transmission protocol;

receiving the document image data at the receiving device using the facsimile transmission protocol; and altering the received document image data based on the received vectorized data.

11. A method according to claim 10, further comprising:

transmitting color data using the facsimile transmission protocol, the color data describing a color of the colored region; and receiving the color data using the facsimile transmission protocol.

12. A computer-readable medium storing computer-executable process steps to transmit an original document having a colored region, the steps comprising:

a transmitting step to transmit image data corresponding to the original document using a facsimile transmission protocol; and a transmitting step to transmit vectorized data using the facsimile transmission protocol, the vectorized data describing an outline of the colored region.

13. A medium according to claim 12, the steps further comprising:

a receiving step to receive the image data corresponding to the original document;

a receiving step to receive the vectorized data; and an altering step to alter the received image data based on the received vectorized data.

14. A medium according to claim 12, the steps further comprising:

a detecting step to detect the colored region of the original document; and an analyzing step to analyze the colored region to produce vectorized data corresponding to a location of the colored region within the original document.

15. A medium according to claim 12, the steps further comprising:

a transmitting step to transmit color data using the facsimile transmission protocol, the color data describing a color of the colored region.

16. A computer-readable medium storing computer-executable process steps to transmit an image of a document containing a colored region, the steps comprising:

an inputting step to input document image data;

a detecting step to detect the colored region;

a calculating step to calculate a vectorized representation of the colored region;

a querying step to query a receiving device to determine whether or not the receiving device supports vectorized colored regions; and a transmitting step to transmit the document image data and the vectorized representation to the receiving device using a facsimile transmission protocol in a case that it is determined that the receiving device supports vectorized colored regions.

17. A medium according to claim 16, the steps further comprising an altering step to alter the document image data based on the vectorized representation in a case that the receiving device does not support vectorized colored regions.

18. A medium according to claim 16, the steps further comprising:

a transmitting step to transmit color data using the facsimile transmission protocol, the color data describing a color of the colored region.

19. A computer-readable medium storing computer-executable process steps to receive document image data, the steps comprising:

a receiving step to receive a query from a transmitting device to determine whether vectorized colored regions are supported by the device;

an indicating step to indicate to the transmitting device that vectorized colored regions are supported by the device;

a receiving step to receive vectorized data using a facsimile transmission protocol, the vectorized data corresponding to a colored region in a document image;

a receiving step to receive document image data using the facsimile transmission protocol, the image data corresponding to the document image; and an altering step to alter the received document image data based on the received vectorized data.

20. A medium according to claim 19, the steps further comprising:

a receiving step to receive color data using the facsimile transmission protocol, the color data describing a color of the colored region.

21. A computer-readable medium storing computer-executable process steps to transmit and to receive image data of a document having a colored region, the steps comprising:

an inputting step to input document image data to a transmitting device;

a detecting step to detect the colored region;

a calculating step to calculate a vectorized representation of the colored region;

a transmitting step to transmit a query to a receiving device to determine whether or not the receiving device supports vectorized colored regions;

a receiving step to receive the query to determine whether vectorized colored regions are supported by the receiving device;

an indicating step to indicate to the transmitting device that vectorized colored regions are supported by the receiving device;

a transmitting step to transmit the document image data and the vectorized representation from the transmitting device to the receiving device using a facsimile transmission protocol;

a receiving step to receive the vectorized representation of the colored region at the receiving device using the facsimile transmission protocol;

a receiving step to receive the document image data at the receiving device using the facsimile transmission protocol; and an altering step to alter the received document image data based on the received vectorized data.

22. A medium according to claim 21, the steps further comprising:

a transmitting step to transmit color data using the facsimile transmission protocol, the color data describing a color of the colored region; and a receiving step to receive the color data using the facsimile transmission protocol.

23. An apparatus for facsimile transmission of an original document having a colored region, comprising:

means for transmitting image data corresponding to the original document using a facsimile transmission protocol; and means for transmitting vectorized data using the facsimile transmission protocol, the vectorized data describing an outline of the colored region.

24. An apparatus according to claim 23, further comprising:

means for receiving the image data corresponding to the original document;

means for receiving the vectorized data; and means for altering the received image data based on the received vectorized data.

25. An apparatus according to claim 23, further comprising:

means for detecting the colored region of the original document; and means for analyzing the colored region to produce vectorized data corresponding to a location of the colored region within the original document.

26. An apparatus according to claim 23, further comprising:

means for transmitting color data using the facsimile transmission protocol, the color data describing a color of the colored region.

27. An apparatus for transmitting an image of a document containing a colored region, comprising:

means for inputting document image data;

means for detecting the colored region;

means for calculating a vectorized representation of the colored region;

means for querying a receiving device to determine whether or not the receiving device supports vectorized colored regions; and means for transmitting the document image data and the vectorized representation to the receiving device using a facsimile transmission protocol in a case that it is determined that the receiving device supports vectorized colored regions.

28. An apparatus according to claim 27, further comprising means for altering the document image data based on the vectorized representation in a case that the receiving device does not support vectorized colored regions.

29. An apparatus according to claim 27, further comprising:

means for transmitting color data using the facsimile transmission protocol, the color data describing a color of the colored region.

30. An apparatus for use in a device for receiving document image data, comprising:

means for receiving a query from a transmitting device to determine whether vectorized colored regions are supported by the device;

means for indicating to the transmitting device that vectorized colored regions are supported by the device;

means for receiving vectorized data using a facsimile transmission protocol, the vectorized data corresponding to a colored region in a document image;

means for receiving document image data using the facsimile transmission protocol, the image data corresponding to the document image; and means for altering the received document image data based on the received vectorized data.

31. An apparatus according to claim 30, further comprising:

means for receiving color data using the facsimile transmission protocol, the color data describing a color of the colored region.

32. A system for transmitting and receiving image data of a document having a colored region, comprising:

means for inputting document image data to a transmitting device;

means for detecting the colored region;

means for calculating a vectorized representation of the colored region;

means for transmitting a query to a receiving device to determine whether or not the receiving device supports vectorized colored regions;

means for receiving the query to determine whether vectorized colored regions are supported by the receiving device;

means for indicating to the transmitting device that vectorized colored regions are supported by the receiving device;

means for transmitting the document image data and the vectorized representation from the transmitting device to the receiving device using a facsimile transmission protocol;

means for receiving the vectorized representation of the colored region at the receiving device using the facsimile transmission protocol;

means for receiving the document image data at the receiving device using the facsimile transmission protocol; and means for altering the received document image data based on the received vectorized data.

33. A system according to claim 32, further comprising:

means for transmitting color data using the facsimile transmission protocol, the color data describing a color of the colored region; and means for receiving the color data using the facsimile transmission protocol.

* * * * *